(12) United States Patent
Holman et al.

(10) Patent No.: US 9,377,183 B2
(45) Date of Patent: Jun. 28, 2016

(54) LOW-PROFILE LIGHTING SYSTEMS

(71) Applicant: Qualcomm Mems Technologies, Inc., San Diego, CA (US)

(72) Inventors: Robert L Holman, Evanston, IL (US); Jeffrey B Sampsell, Pueblo West, CO (US); Matthew B Sampsell, Jr., Chicago, IL (US)

(73) Assignee: QUALCOMM MEMS TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 13/829,443

(22) Filed: Mar. 14, 2013

(65) Prior Publication Data

US 2014/0268872 A1 Sep. 18, 2014

(51) Int. Cl.
| | |
|---|---|
| *F21V 7/04* | (2006.01) |
| *B60Q 1/06* | (2006.01) |
| *F21V 23/02* | (2006.01) |
| *H01G 9/004* | (2006.01) |
| *F21V 29/00* | (2015.01) |
| *F21V 8/00* | (2006.01) |
| *F21V 29/74* | (2015.01) |
| *F21Y 101/02* | (2006.01) |

(52) U.S. Cl.
CPC .............. *F21V 23/02* (2013.01); *F21V 29/2212* (2013.01); *F21V 29/74* (2015.01); *G02B 6/0083* (2013.01); *H01G 9/004* (2013.01); *F21V 2200/20* (2015.01); *F21Y 2101/02* (2013.01); *G02B 6/0021* (2013.01); *G02B 6/0031* (2013.01); *G02B 6/0038* (2013.01); *G02B 6/0073* (2013.01); *Y10T 29/49128* (2015.01)

(58) Field of Classification Search
CPC .. G02B 6/0068; G02B 6/0023; G02B 6/0031; G02B 6/0073; G02B 6/0016; G02B 6/003; G02F 1/133615; G02F 1/133606; G02F 2202/36; G02F 1/011; F21V 9/16; H05K 1/0231; H05K 1/16; H05K 1/162; H05K 5/0056
USPC ................... 362/608; 257/703, 916; 361/321; 363/132
See application file for complete search history.

(56) References Cited

U.S. PATENT DOCUMENTS

| | | | |
|---|---|---|---|
| 3,265,886 A | 8/1966 | Wigert | |
| 6,118,651 A * | 9/2000 | Mehrotra et al. | 361/509 |

(Continued)

FOREIGN PATENT DOCUMENTS

| | | |
|---|---|---|
| EP | 2339230 A2 | 6/2011 |
| WO | WO-8807291 A1 | 9/1988 |

OTHER PUBLICATIONS

International Search Report and Written Opinion—PCT/US2014/020568—ISA/EPO—Oct. 20, 2014.

(Continued)

*Primary Examiner* — Jason Moon Han
*Assistant Examiner* — Omar Rojas Cadima
(74) *Attorney, Agent, or Firm* — Knobbe, Martens, Olson & Bear LLP

(57) ABSTRACT

This disclosure provides systems, methods, and apparatuses for low-profile lighting systems. In one aspect, a lighting apparatus can include a lighting apparatus having a light emitter and an electronics substrate including an electrical circuit. An unrolled capacitive film can be attached to the lighting apparatus and electrically coupled to the electrical circuit.

30 Claims, 10 Drawing Sheets

(56) References Cited

U.S. PATENT DOCUMENTS

| | | | |
|---|---|---|---|
| 6,140,751 A * | 10/2000 | Hammer et al. | 313/46 |
| 7,281,820 B2 * | 10/2007 | Bayat et al. | 362/245 |
| 7,456,805 B2 | 11/2008 | Ouderkirk et al. | |
| 7,466,560 B2 * | 12/2008 | Hayashi | H05K 1/0231 361/765 |
| 7,893,444 B2 | 2/2011 | Hsu et al. | |
| 7,898,811 B2 | 3/2011 | Storey | |
| 8,062,912 B2 | 11/2011 | Wang et al. | |
| 8,128,263 B2 * | 3/2012 | Higuchi et al. | 362/373 |
| 8,235,545 B2 * | 8/2012 | Zheng et al. | 362/218 |
| 2006/0238984 A1 * | 10/2006 | Belady et al. | 361/704 |
| 2008/0216296 A1 | 9/2008 | Prymak et al. | |
| 2009/0296403 A1 * | 12/2009 | Zhang | F21S 8/033 362/294 |
| 2010/0102729 A1 * | 4/2010 | Katzir et al. | 315/113 |
| 2011/0273076 A1 | 11/2011 | Liang et al. | |
| 2012/0094442 A1 | 4/2012 | Lin et al. | |
| 2012/0140437 A1 * | 6/2012 | Kim | F21K 9/00 362/84 |

OTHER PUBLICATIONS

Partial International Search Report—PCT/US2014/020568—ISA/EPO—Aug. 1, 2014.

\* cited by examiner

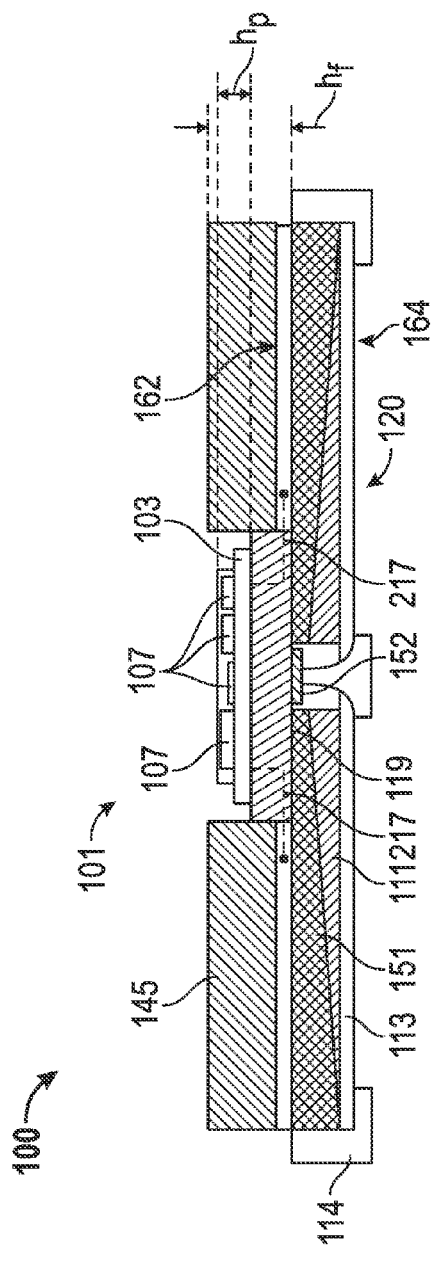
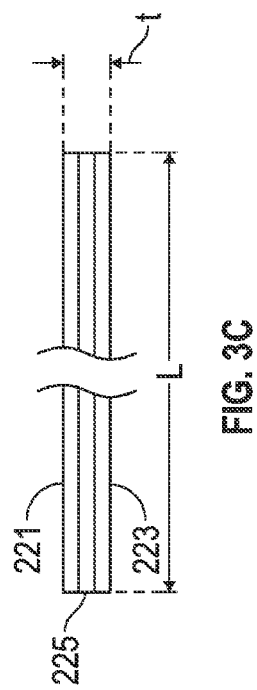
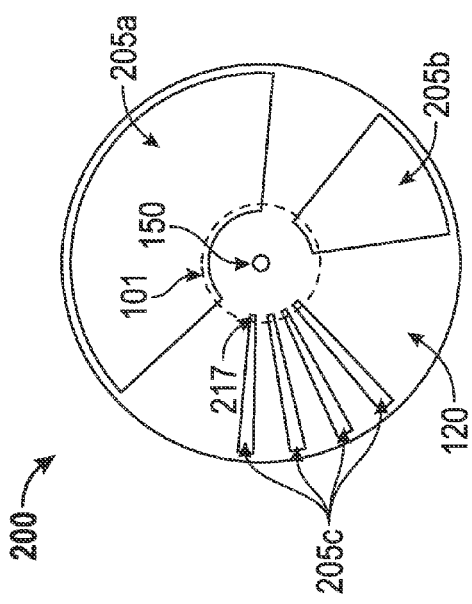
FIG. 3A
FIG. 3B
FIG. 3C

LOW-PROFILE LIGHTING SYSTEMS

TECHNICAL FIELD

This disclosure relates to lighting fixtures, particularly for LED-based lighting apparatus, and manufacturing methods thereof.

DESCRIPTION OF THE RELATED TECHNOLOGY

Conventional lighting fixtures utilize incandescent or fluorescent lighting, and are generally at least several inches deep, and correspondingly bulky. Because of the size and weight of these fixtures, securement of the conventional lighting fixtures to a structure such as a building may be difficult. To reduce the size and weight of conventional fixtures, it can therefore be advantageous to utilize lighting systems having a low-profile. Because some low-profile lighting systems include various electronic components within the system, it can accordingly be advantageous to also reduce the profile or thickness of the electronic components within the system.

SUMMARY

The systems, methods and devices of the disclosure each have several innovative aspects, no single one of which is solely responsible for the desirable attributes disclosed herein.

One innovative aspect of the subject matter described in this disclosure can be implemented in a lighting apparatus. The lighting apparatus can include an assembly including a light source coupled to optical components and having a first surface and a second surface opposite the first surface. An electronics substrate including components of an electrical circuit may be mounted to the apparatus, the electronics substrate mechanically coupled to the first surface. An unrolled capacitive film may be coupled to the electrical circuit.

In another implementation, a method for manufacturing an illumination system is disclosed. The method can include coupling an electronics substrate including components of an electrical circuit to a light emitter. The method can further include attaching an unrolled capacitive film to the illumination system. Moreover, the method can include electrically coupling the capacitive film to the electrical circuit.

In another implementation, an illumination system is disclosed. The illumination system can include means for guiding light. Further, the system can include means for emitting light coupled to the light guiding means. Power supply means may be coupled to the light guiding means. The system can also include means for providing low profile capacitance to the power supply means.

In yet another implementation, low profile package for an electronic module configured for incorporation into an external system is disclosed. The package can include at least one package substrate having a first surface and a second surface opposite the first surface. Electronic components can be mounted to a surface of the package substrate. A substantially flat, unrolled capacitive sheet can be electrically coupled to at least one electrical contact on the package substrate.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3A is a side cross-sectional view of one implementation of an illumination system including an electronics substrate coupled with a light emitter and a capacitive film positioned under a plurality of cooling fins.

FIG. 3B is a top plan view of the illumination system of FIG. 3A.

FIG. 3C is a side cross-sectional view of an unrolled capacitive film, according to one implementation.

Like reference numbers and designations in the various drawings may indicate like elements.

DETAILED DESCRIPTION

Figure 1A:
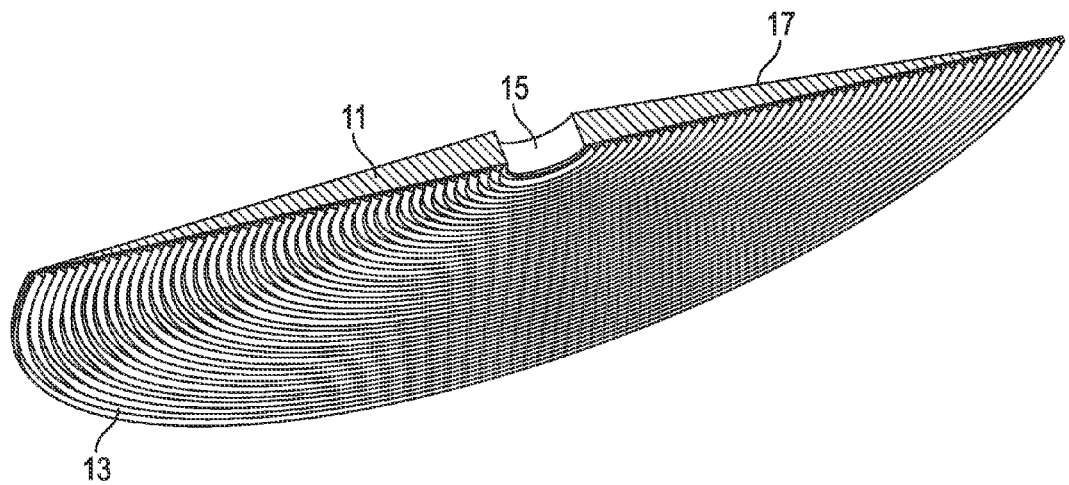
FIG. 1A is a cross-section perspective view of an implementation of a circular light guide that can be used to receive light from one or more centrally located light emitting diodes (LEDs).

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to provide illumination. More particularly, it is contemplated that the described implementations may be included in or associated with lighting used for a wide variety of applications such as, but not limited to: commercial, residential, automotive, avionic, as well as marine lighting.

Implementations may include but are not limited to lighting in offices, schools, manufacturing facilities, retail locations, restaurants, clubs, hospitals and clinics, convention centers, hotels, libraries, museums, cultural institutions, government buildings, warehouses, military installations, research facilities, gymnasiums, sports arenas, backlighting for displays, signage, billboards, or lighting in other types environments or applications. In various implementations the lighting may be overhead lighting and may project downward a distance larger (for example, several times or many times larger) than the spatial extent of the lighting fixture. Thus, the teachings are not intended to be limited to the implementations depicted solely in the Figures, but instead have wide applicability as will be readily apparent to one having ordinary skill in the art.

In some implementations, a lighting apparatus can include a light source, or one or more LEDs coupled with optics, or one or more LEDs coupled with optics as well as electrical and heat-management components. The light source may be a thin-profile lighting apparatus, which can include an LED and an elongated light guide into which the light from the LED is injected. The light is guided throughout the length of the light guide and is coupled out at different locations across the light guide such that the light can be output evenly from a large-area surface. One or more optical films may be disposed forward of the output aperture of the lighting apparatus to operate on the light emitted therefrom. In some implementations, the optical films can shape the light beams emitted from the light source. The optical film may be a sheet having a contoured surface, such as a surface with a plurality of grooves. In some implementations, the grooves form prismatic structures having sawtooth profiles. Light propagating through the contoured sheet can be, in different implementations, redirected by the surface contours by refraction or reflection. In some implementations, a plurality of different types of optical films having different functionalities can be stitched together into a composite film. A composite film can then include separate sections, which are non-overlapping regions of the composite optical film. In some embodiments, each section can include one films or a stack of films. Each section of the composite optical film can operate differently on a single input beam to produce differing output beams. For example, one section of the composite film can produce an output beam directed in one direction and another section can produce an output beam directed in another direction. The two beams may have different divergence angles. The two beams may also have different colors, shapes, and/or sizes in the far field.

In some implementations, a lighting device or apparatus can include a connection portion for electrically and/or mechanically coupling the lighting device to a light fixture. As used herein, the term "light fixture" refers to any fixture or structure configured to be electrically and/or mechanically coupled to any portion of a lighting device, for example, a recessed light housing, a downlight fixture, a can fixture, a pot light fixture, a cove light fixture, a torch lamp fixture, a pendant light fixture, a sconce fixture, a track light fixture, and/or a bay light fixture, whether secured to a vertical surface such as a wall, a horizontal surface such as a ceiling, soffit, floor, table, or other structure.

Conventional lighting systems are bulky, and light fixtures configured to retain conventional lighting are similarly bulky and correspondingly heavy. When installed in structural members such as ceiling tiles, walls, or soffits the size and weight of conventional lighting fixtures require that the fixtures be secured to rigid structural members such as framing. In contrast, some LED-based lighting apparatus can be made significantly more thin and/or light-weight than conventional lighting systems. For example, a light fixture configured to retain an LED-based lighting apparatus may weigh less than one pound installed, whereas conventional lighting fixtures may weigh more than 5 pounds, and may even weight as much as 50 pounds or more Such lighter fixtures can be safely secured to, for example, ceiling panels in false ceilings, without requiring further securement directly to frames or other more rigid structural members.

Particular implementations of the subject matter described in this disclosure can be implemented to realize one or more of the following potential advantages. In some implementations, a lower profile illumination system can be realized. For example, in various implementations, lower profile capacitors can be used in electrical circuits that are associated with and/or coupled to the illumination system. By reducing the height of various electronic elements, such as capacitors, the overall height of the illumination system can be reduced.

FIG. 1A is a cross-section perspective view of an implementation of a circular light guide that can be used to receive light from one or more centrally located light emitting diodes (LEDs). The circular light guide plate 11 has arranged over its rearward surface a faceted light-turning film 13. The thickness of the light guide plate 11 may decrease from the center towards the perimeter, creating a tapered profile. The light guide plate 11 also includes a central cylindrical surface 15 through which light can be injected into the light guide plate 11. Light entering the central boundary 15 propagates radially through the body of the light guide plate 11 by total internal reflection. In implementations where the light guide plate 11 is tapered, light guided in the light guide plate 11 will propagate by total internal reflection until it is ejected by the tapered light guide plate 11 at an oblique angle relative to the rearward surface 16 and/or the light guide plate 11. To facilitate the ejection of light from the tapered light guide plate 11, a layer of relatively low index material can be disposed between the light guide plate 11 and the light-turning film 13. The obliquely ejected light can optionally interact with the light-turning film 13. In some implementations, the light ejected by the tapered light guide plate 11 can be a narrow beam having an angular width similar to the taper angle of the tapered plate 11. In some implementations, light-turning film 13 can turn the light so that center of the output beam is substantially normal to the rearward surface 16, the forward surface 17, and/or the light guide plate 11. Alternatively, the light-turning film 13 can be configured to turn the light so that the center of the output beam is at any angle relative to the forward surface 17. In the illustrated implementation, the light-turning film 13 has a metalized surface so as to reflect light emitted from the light guide plate 11 such that the light is turned and output from through light guide plate 11 and emitted only from the forward surface 17.

Figure 1B:
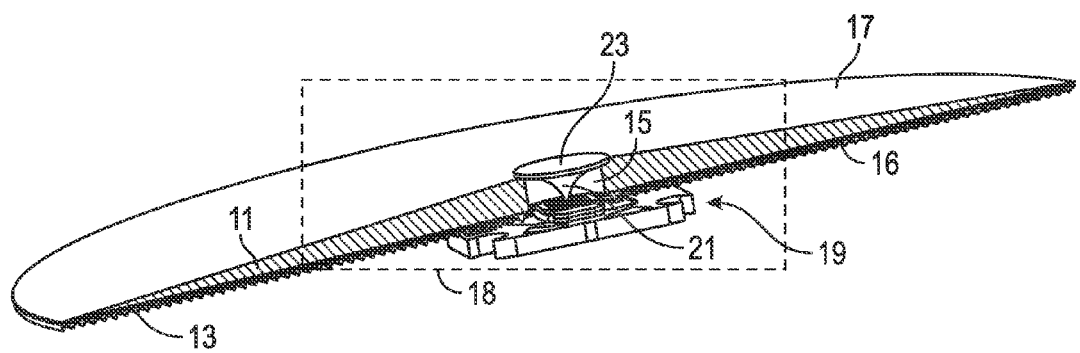
FIGS. 1B and 1C illustrate cross-section perspective views of an implementation of an assembly including a light emitter and the circular light guide of FIG. 1A.
Figure 1C:
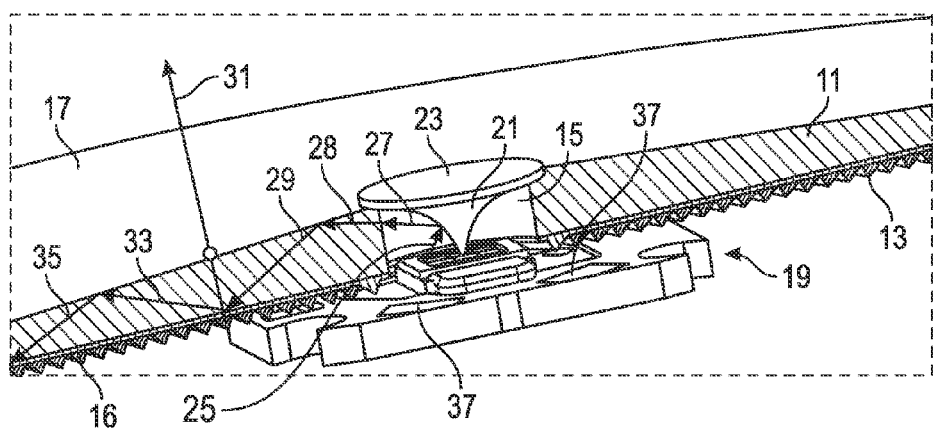

FIGS. 1B and 1C illustrate cross-sectional perspective views of an implementation of an LED emitter combined with the circular light guide plate 11 of FIG. 1A. FIG. 1C shows a magnified view 18 of the cross-section of FIG. 1B. As illustrated, an LED emitter 19 and a radially symmetric reflector 23 are combined with the light guide plate 11 shown in FIG. 1A. The light emitter 19 may include one or more light emitters such as light emitting diodes. Light emitted from LED emitter 19 reflects off the curved surface 21 of a radially symmetric reflector 23. In some implementations, radially symmetric reflector 23 can be an etendue-preserving reflector may be used to couple light from the light emitter 19 to the light guide plate 11. Light entering the light guide plate 11 propagates therein by total internal reflection between rearward surface 16 and forward surface 17, until it is ejected by the tapered light guide plate 11. For example, light ray 25 shown in FIG. 1C is redirected from the reflector 23 as ray 27 towards the surface 15 of the light guide plate 11. On entry, example ray 27 is shown as propagating ray 28, which is reflected off the forward surface 17 of the light guide plate 11 as ray 29 and redirected back towards the rearward surface 16. Light that strikes the surface rearward surface 16 at less than the critical angle passes through rearward surface 16 towards light-turning film 13 and is turned out as ray 31. Remaining light continues to propagate within the light guide plate 11 by total internal reflection as rays 33 and 35. As illustrated in FIGS. 1A-1C, the light-turning film 13 is arranged under the rearward surface 16 of the light guide plate 11 and is reflective to direct the light out of the forward surface 17.

Figure 1D:
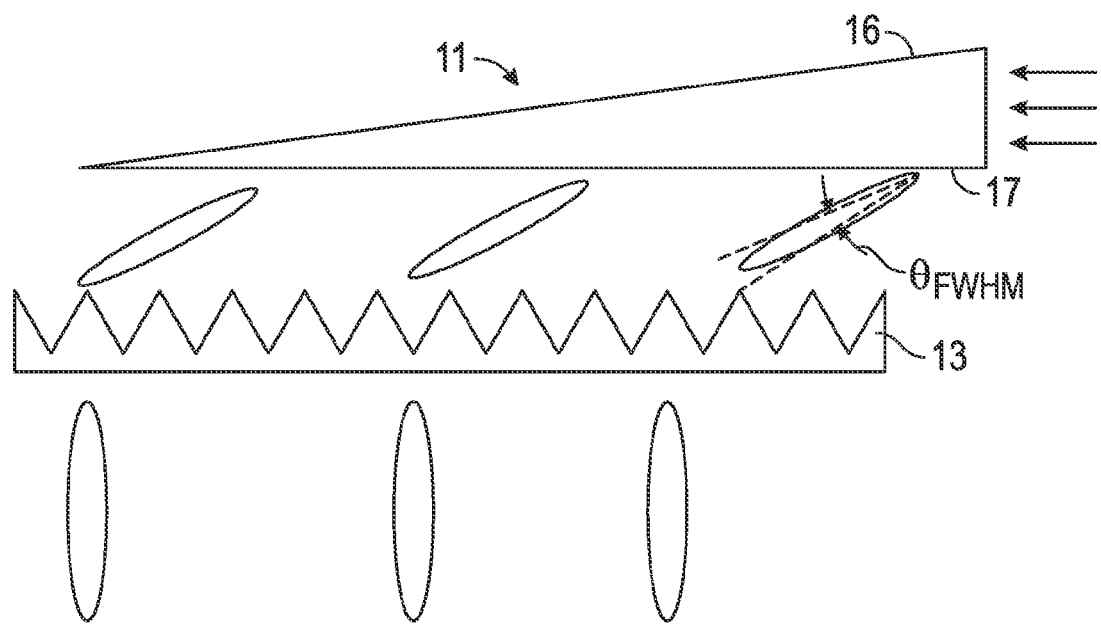
FIG. 1D illustrates an exploded schematic view of another implementation of a circular light guide plate with a light-turning film.

FIG. 1D illustrates an exploded schematic view of a cross section of another implementation of a circular light guide plate with a light-turning film. As illustrated, the light-turning film 13 is arranged over the forward surface 17 of the light guide plate 11. In this configuration, light enters the light guide 11 from the right side and propagates through the light guide plate 11 as described above. In some implementations, the rearward surface 16 can be metalized so as to prohibit light from being emitted through the rearward surface 16. Light propagates within light guide plate 11 until emitted from forward surface 17 at an oblique angle relative to the forward surface 17. Light emitted from forward surface 17 can interact with light-turning film 13. As illustrated, the light-turning film 13 turns the light such that it exits the light-turning film 13 substantially perpendicular to the light guide plate 11 and the forward surface 17 of the light guide plate 11. The light-turning film 13, in the illustrated implementation, does not substantially affect the angular beam width of the light, for example, the light-turning film 13 does not affect the full width at half maximum of the beam, $\theta_{FWHM}$. Rather, the light-turning film 13 redirects incident light from the circular light guide plate 13. The prism-like features of the light-turning film 13 need not be symmetric, and are shown as symmetric for illustrative purposes only. Although illustrated as turning light to be perpendicular to the forward surface 17, in other implementations the light-turning film 13 can be configured to turn the light at any angle relative to the forward surface 17. Moreover, the light-turning film 13 need not be uniform. For example, one portion may turn light at a first angle, with a second portion turning light at a second angle.

As shown, the light guide plate 11 is tapered such that its thickness decreases radially from the central portion to the peripheral portions. The tapering of the light guide plate 11 further assists light to be turned towards light-turning film 13, and output from the surface 17 of the light guide plate 11. In some implementations, the light guide plate 11 can be sloped from its central portion to its peripheral portions at an angle of about 5 degrees or less. In some implementations, the light guide plate 11 can be sloped at an angle between 1 to 10 degrees. In some implementations, the angle can range from 2 to 7 degrees. The slope of the light guide plate 11 can be related to the width of the light beam exiting the light guide plate 11. In some implementations where narrower beams are preferred, the light beam emitted from the forward surface 17 has a beam width, for example, $\theta_{FWHM}$=60 degrees or less, 45 degrees or less, 30 degrees or less, 15 degrees or less, 10 degrees or less, or 5 degrees or less. In other implementations where wider beams are preferred, the light beam emitted from the forward surface 17 has a beam width, for example, $\theta_{FWHM}$=120 degrees or less or 90 degrees or less. In some implementations where the slope of the light guide plate would be too large to be practical in order to achieve a desired output beam width, the light guide plate 11 may include one or more steps with regions of the light guide plate being sloped as desired rather than the whole light guide plate 11 having one continuous slope as illustrated. In some implementations, the light-turning film 13 or the light guide plate 11 and the light turning film 13 together can be configured to affect angular width of light distribution in addition to only turning the light without affecting the beam width. The configuration of light extraction features can assist in controlling the direction and distribution of light output from the light guide plate 11. In some implementations, a stack of multiple films or plates may be provided to turn, redirect, or change the shape of the beam. As illustrated in FIG. 1D, a relatively narrow beam exist the forward surface 17 of the light guide plate at an oblique angle. Film 13 is illustrated as a turning film that turns the light from oblique (relative to the normal of the forward surface 17) to roughly normal. In some implementations, the film 13 may turn the light, and a separate film may take the turned light and spread the turned light or otherwise adjust the beam width. The functions of the illustrated film 13 may thus be spread among multiple layers.

In some implementations, light emitted from LED emitter 19 can be evenly distributed across the surface of the assembly 20. In some implementations, light exiting the light guide plate 11 is substantially collimated. Additionally, brightness of the source (such as the LED emitter) is decreased because the light is distributed across a larger area.

In some implementations, the reflector 23 can be replaced by other functionally similar coupling optics, including segmented reflectors, a lens, groups of lenses, a light pipe section, hologram, etc. As shown, the LED emitter(s) emits light in response to a DC operating voltage applied to terminals 37. In some implementations, the LED emitter assembly 19 may have a different form of light-emitting surface, such as a raised phosphor, raised clear encapsulent, etc.

Figure 1E:
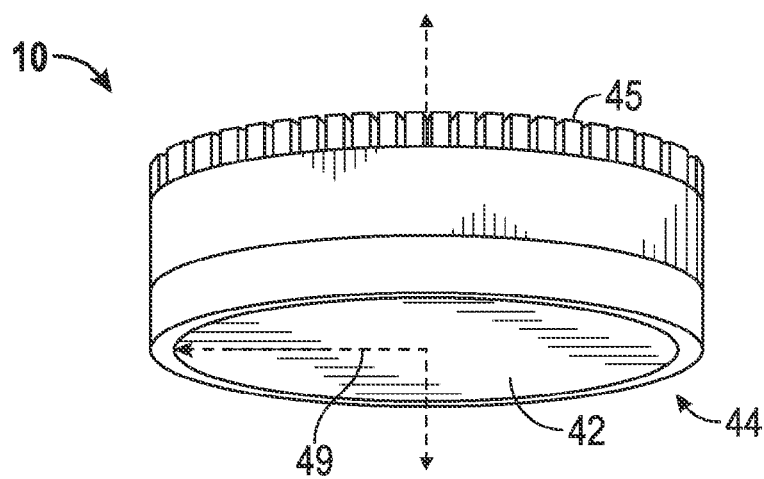
FIG. 1E shows a perspective view of an example of a lighting apparatus incorporating a light guide such as the light guides illustrated in FIGS. 1A-1D.

FIG. 1E shows a perspective view of an example of a lighting apparatus 10 incorporating a light guide such as the light guides illustrated in FIGS. 1A-1D. To assist in the description of the implementations described herein, the following coordinate terms are used, consistent with the coordinate axes illustrated in FIG. 1E. A "longitudinal axis" 41 is generally orthogonal to the first side 44 of the lighting apparatus 10. A "radial axis" 49 is any axis that is normal to the longitudinal axis. In addition, as used herein, "the longitudinal direction" refers to a direction substantially parallel to the longitudinal axis and "the radial direction" refers to a direction substantially parallel to a radial axis. As illustrated in FIG. 1E, the lighting apparatus 10 can have a front side 44 and a back side 46 (see FIG. 1F). The front side 44 can include a light emitting surface or aperture 42 configured to provide light to a space or volume.

A lighting apparatus (or alternatively an illumination system) refers to any structure that includes a light emitter and at least some associated electrical components for powering or otherwise controlling the light emitter. For example, a lighting apparatus can include a light bulb including a filament light as a light emitter and a diffusive glass bulb surrounding the filament as an optical structure associated with the light emitter. Another example of a lighting apparatus can include a light-emitting diode ("LED") optically coupled to a light guide where the light guide includes means for ejecting light out of the light guide. The use of a light guide to distribute the LED light over an output aperture of the lighting apparatus can result in a lighting apparatus in a relatively thin profile. In such a thin illumination lighting apparatus or system, the means for ejecting light can include a taper angle between surfaces of the light guide, thereby forming a tapered light guide, as discussed above. In some implementations, the means for ejecting light can include light ejecting facets and/ or dot structures. Although illustrated in a particular implementation, a lighting apparatus can include other apparatus capable of providing visible light, including, for example, an incandescent bulb, a fluorescent tube, or any other one or more suitable sources of light.

In some implementations, a lighting apparatus can include one or more optical conditioners disposed adjacent to the light emitting surface and configured to provide various shapes and types of far-field lighting, for example, a spotlight, a widely spread beam, or a diffuse light, and shaped as circular, square, rectangular, or other shape. In some implementations, the light-turning film 13 of FIG. 1D can be considered an optical conditioner. In some implementations, the optical conditioner is a thin film including a lenticular lens having optical power which is configured to provide various beam shapes. In some implementations, a lighting apparatus can include one or more heat transfer structures configured to dissipate heat or thermal energy. For example, the lighting apparatus 10 of FIG. 1E can include one or more heat transfer or cooling fins 45 configured to dissipate heat.

Figure 1F:
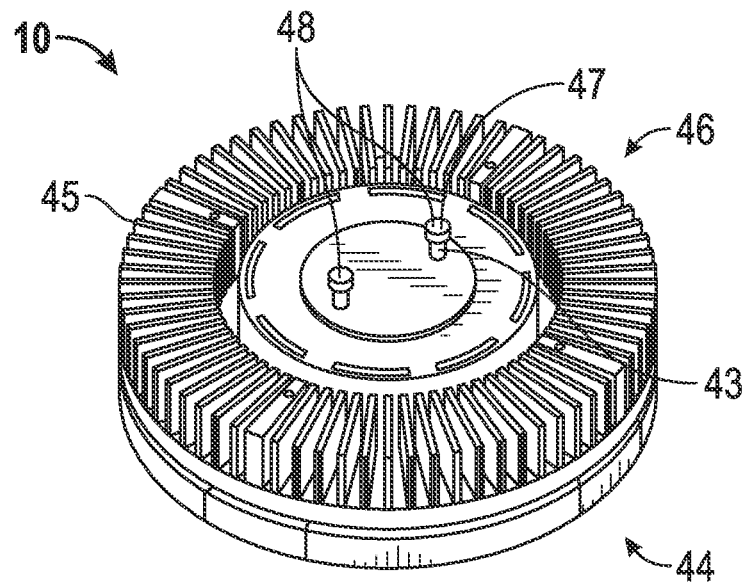
FIG. 1F shows another perspective view of an example of a lighting apparatus incorporating a light guide such as the light guides illustrated in FIGS. 1A-1D.

FIG. 1F shows another perspective view of an example of a lighting apparatus incorporating a light guide such as the light guides illustrated in FIGS. 1A-1D. As illustrated, in some implementations, the back side 46 of the lighting apparatus 10 can include one or more electrical connection contacts 48. In some implementations, the contacts 48 can include two or more prongs, blades, or pins, extending longitudinally from the back side 46 of the lighting apparatus 10. These contacts 48 may provide electrical and/or mechanical connection between the lighting apparatus 10 and a fixture configured to retain the light apparatus 10.

Figure 1G:
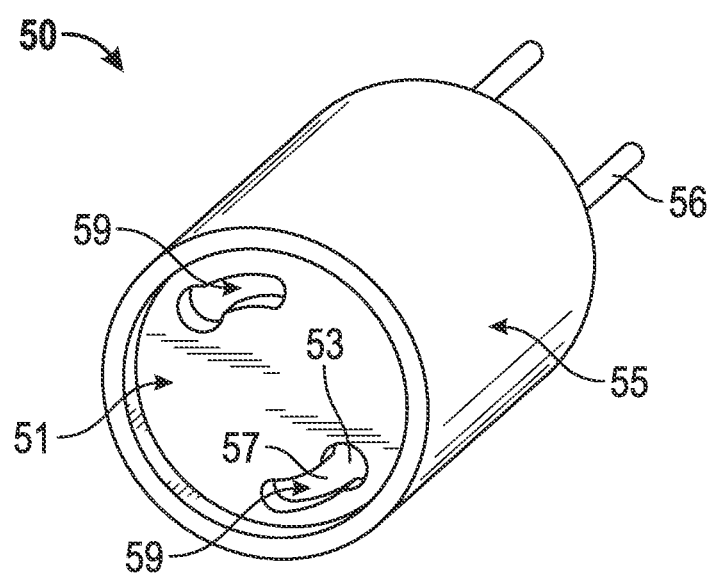
FIG. 1G shows a perspective view of an example of a retention structure configured to retain a lighting apparatus such as the lighting apparatus of FIG. 1F.

FIG. 1G shows a perspective view of an example of an adapter configured to be coupled to the lighting apparatus of FIG. 1F. The adapter 50 can engage the contacts of a lighting apparatus to provide at least electrical connection with the lighting apparatus 10 (see FIG. 1F). In some implementations, if the adapter 50 is fixedly coupled to another structure, such as a fixture or a structural member, the adapter 50 can also provide mechanical support to retain the lighting apparatus 10 in place. A retention region 51 of the adapter 50 can include two or more terminals 59 configured to receive the contacts 48 (see FIG. 1F) of the lighting apparatus 10. In this way, the adapter 50 can be at least electrically coupled to the lighting apparatus 10 via the engaging structure of the contacts 48 of the lighting apparatus 10 and the terminals 29 disposed within the retention surface 51 of the adapter 50.

In one implementation, the adapter 50 is a GU 24 socket and the lighting apparatus 10 includes a GU 24 base configured to be retained within the socket, although similar low-profile interconnection structures can also be used. In other implementations which are not as space-constrained, other conventional interconnection structures, such as E26/27, can also be used, and custom or proprietary connectors can also be used. In some implementations, the adapter 50 can include one or more wires or conductive traces (not shown) disposed within the adapter 50 and providing an electrical path between the terminals 59 and wiring 56 extending from the adapter 50 to provide power to the lighting apparatus 10. Thus, in some implementations, an adapter 50 may be used primarily to provide electrical connection to the lighting apparatus, rather than mechanical support. For example, as discussed in greater detail below, an adapter may be connected to household wiring or an electrical conduit to provide an adapter for easily connecting an installed lighting apparatus to a power source.

As shown in FIG. 1F, each contact 48 of the lighting apparatus 10 can include a proximal portion 43 extending from the back side 46 of the lighting apparatus 10 and a distal portion 47 extending from the proximal portion 43. In some implementations, the distal portion 47 can be enlarged or flared relative to the proximal portion 43 such that the distal portion 47 has a minimum radial dimension that is greater than a maximum radial dimension of the proximal portion 43. As shown in FIG. 1G, each terminal 59 can include a slot having a first portion 53 and a second portion 57. The first portion 53 can be sized and shaped to receive the distal portion 47 of a contact 48. The second portion 57 can be sized and shaped to inhibit the longitudinal movement or withdrawal of a received contact 48 by abutting or otherwise engaging the distal portion 47 of the received contact 48. In this way, the terminals 59 and contacts 48 can engage one another to releasably or temporarily connect the adapter 50 relative to the lighting apparatus 10.

The lighting apparatus 10 may in some implementations be supported not from behind via connectors such as contacts 48, but may instead be supported from a radial edge or from the front side 44. Thus, all or a portion of the mechanical support may be provided through contact with portions of the lighting apparatus 10 other than the contacts 48, such that electrical connection may be provided separately from mechanical support. The adapter 50 and variants or similar structures discussed herein may thus provide means for electrically connecting a retained lighting apparatus to a power source, and in some implementations may also provide means for providing mechanical support to a lighting apparatus so as to retain it within a fixture.

To reduce the size and weight of illumination systems, it can be desirable to form smaller, low-profile illumination systems and lighting apparatuses. In various illumination systems, electronics can be coupled to or integrated with the illumination systems for various purposes, including, e.g., converting alternating current (AC) from a power source to direct current (DC) suitable for powering a light emitter of the illumination system, such as, e.g., a light emitting diode, or LED. These power supplies may include a rectifier, magnetics, switching circuits, and an electronic controller for regulating an output voltage at a desired level. Various AC-to-DC conversion circuits can also include capacitors for a number of reasons, such as power supply output capacitors for reducing ripple in the DC voltage after conversion. However, the typical electrolytic capacitors used for these purposes are tall cylindrical or tubular packages, increasing the profile of the illumination system.

Some illumination systems can include thermal cooling fins configured to transfer heat away from the system. Conventional cooling fins can also be tall, or high profile, in order to conduct heat away from the lighting apparatus to the outside environs. As illumination systems become more thermally efficient, cooling fins can accordingly be made shorter, or lower profile. However, as cooling fins become shorter, the overall height of the illumination system may not be correspondingly reduced, because the height of the electrolytic power supply output capacitors or other capacitive elements may define the minimum overall height of the system. Accordingly, if the taller or higher profile electronic or passive elements, such as the electrolytic capacitors, are made to be shorter and/or thinner, the overall height of the illumination system can be made shorter. As a result, if the height of the components of the electronics is made small enough, the overall system height may instead be driven only by the height of the cooling fins instead of the height of, e.g., capacitive elements. Thus, in various implementations disclosed herein, lower profile capacitors can be employed to reduce the overall height or profile of the illumination system.

Figure 2A:
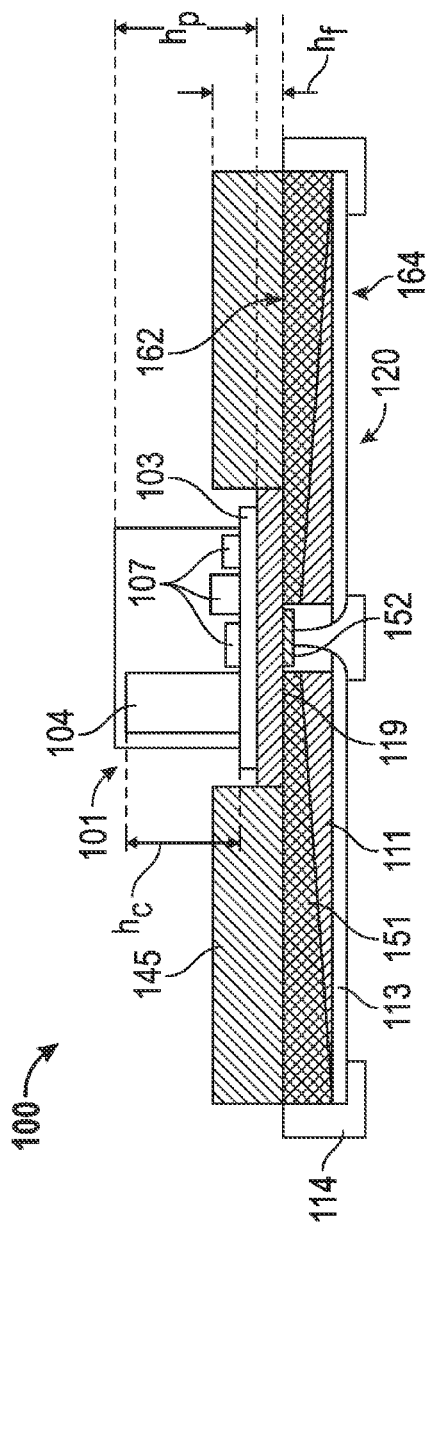
FIG. 2A is a side cross-sectional view of an implementation of an illumination system 100 including electronics 101 coupled or integrated with an assembly including a light emitter and optical components.

FIG. 2A is a side cross-sectional view of an implementation of an illumination system 100 including electronics 101 coupled or integrated with an assembly including a light emitter and optical components. As illustrated, the optical components include a light guide plate 111 and light turning film 113 and reflector (designated 23 in FIG. 1B). However, in some implementations, the optical components may include only a reflector, for example, a reflector for an LED lighting apparatus without any light guide. In various implementations, the system 100 can be at least partially enclosed by a housing 114. The electronics 101 may include its own housing, which may be part of or separate from an overall housing for the illumination system. Different portions of the illumination system may be fully or partially enclosed with the same or separate housings. The assembly 120 can have a first surface 162 and a second surface 164 opposite the first surface 162. As explained above, the assembly 120 can include a light guide plate 111 and a light turning film 113. In various implementations, as above, the light guide plate 111 can be tapered. In other arrangements, the light guide plate 111 can be substantially planar. In various implementations, the assembly 120 can include a light guide support structure 151. The light guide plate 111 can optionally be coupled to the light guide support structure 151, which can be any suitable substrate or plate. The light guide support structure 151 may be reflective to redirect light that exits the rear of light guide plate 111 back in the forward direction. In other implementations, however, there may be no support structure 151.

In addition, the assembly 120 can include a light emitter 152 coupled to thermal management features 119 (such as heat-transfer devices in thermal contact with heat sink fins) for dissipating heat from light emitter 152. The light emitter can be as described above with reference to the light emitter 19 of FIG. 1B. In various implementations, the light emitter 152 can be a light emitting diode, or LED. Skilled artisans will appreciate that other types of light emitters may be suitable. As explained above, light emitted from the light emitter 152 can be directed along the light guide plate 111 for illumination.

The illustrated electronics 101 can include various electronic components, such as passive components, active components, integrated circuits, etc., mounted to an electronics substrate 103. The electronics substrate 103 can be a printed circuit board (PCB) in various implementations, although skilled artisans will appreciate that other types of substrates, such as leadframe-based or ceramic substrates, may be suitable. As shown in the implementation of FIG. 2A, the electronics 101 may be mounted to the assembly 120 and electrically couple to the assembly 120 by way of one or more electrical contacts.

In some implementations, the electronics 101 can be configured to convert AC power input to the system 100 into DC power suitable for powering the light emitter 152. For example, standard AC voltage (e.g., 110 V at 60 Hz) can be supplied to the system 100 and can be converted by the electronics 101 into a stable DC voltage appropriate for the light emitter 152, such as an LED. For example, the DC voltage used by the light emitter 152 may be between about 3 V and about 24 V, but any voltage level is suitable depending on the characteristics of the light emitter 152. 4V, 6V, 12V, and 24V are common LED voltage input ratings, although some red LEDs are available that operate at 2-3V input. As shown in FIG. 2A, the electronics 101 can include a conventional tubular electrolytic capacitor 104 and one or more electronic components 107 mounted to the electronics substrate 103. The capacitance of the tubular capacitor 104 can range between about 10 µF and about 600 µF, but a variety of different sizes may be suitable in different applications. For example, in some arrangements, the tubular capacitor 104 can be a 470 µF capacitor. For high power LED's, more than 600 µF may be desirable. The electronic components 107 can include other capacitors and passive components, or the electronic components 107 can include active components and integrated circuits. For example, the electronics components 107 can include additional smaller capacitors having a capacitance ranging between about 100 pF and about 1 µF. In some arrangements, for example, the electronics 101 can include between about seven to ten capacitors of a variety of sizes and capacitances.

During operation of the light emitter 152, a significant amount of heat can be generated. If uncontrolled, heat generated by the light emitter 152 may damage various components of the assembly 120, such as the light guide plate 111 or the electronics 101. Furthermore, heat generated by the light emitter 152 may also damage external components, such as the structure to which the illumination system 100 is mounted. Consequently, one or more cooling fins 145 may be coupled to the first surface 162 of the assembly 120. The cooling fins 145 can be made of any suitable thermally conductive material, e.g., any suitable metal. As shown in FIGS. 1F and 2A, the cooling fins 45 (FIG. 1F) or 145 (FIG. 2A) may extend outwardly in a direction substantially perpendicular to the first surface 162 of the assembly 120. The fins 45 or 145 can also extend radially from a position near the electronics 101 to or near the periphery of the system 100. The fins 45 or 145 can thus be positioned around a perimeter of the electronics 101. Heat generated by the light emitter 152 may thereby be conducted away from the light emitter 152 and/or the electronics 101.

Because the cooling fins 145 extend away from the assembly 120, the fins 145 can occupy valuable space within the system 100, particularly with respect to the overall height of the system 100. For example, as shown in FIG. 2A, the cooling fins 145 can have a height, $h_f$, extending from the first surface 162 of the assembly 120 to the outer ends of the fins 145. As explained herein, it can be advantageous to form the fins 145 such that they are as short as possible. The height, $h_f$, may in various arrangements be driven by the amount of heat generated by the light emitter 152. As light emitters become more thermally efficient, therefore, the height, $h_f$, may accordingly be reduced. Thus, if the overall system height or thickness is driven by the height, $h_f$, of the fins 145, then illumination systems may generally be made thinner and lower profile as thermal efficiency of light emitters improves.

Yet in some arrangements, the overall height may not be driven by the cooling fins 145. Rather, in some arrangements, the overall height may be affected by a height, $h_p$, of the electronics 101. Many components of a modern DC power supply, such as surface-mount components, can be made quite thin (e.g., on the order of 0.1-0.2 inches in thickness). However, there are often various components in a DC power supply, e.g., the electronics 101, which can be disadvantageously large. For instance, the electronics 101 can often include components that are taller than the height of the cooling fins 145, such as the tubular electrolytic capacitor 104 that can be used to smooth the transients in the DC voltage that remain after converting the incoming AC signal to DC voltage.

As an example, in various implementations, the assembly 120 can be about 0.5 inches thick and the cooling fins 145 and/or the electronics 101 can be about 0.5 to 0.75 inches thick for a total thickness of between about 1 inch and about 1.25 inches. A standard 20 W power supply (such as the electronics 101) may use a tubular shaped ripple smoothing capacitor 104 that is about 0.75 inches in height and about 0.35 inches in diameter. If the other electronics components are relatively thin, then the large tubular ripple capacitor 104 would occupy a large percentage of the vertical height or thickness of the space reserved for the electronics electronics 101 and, e.g., extending over the top of the cooling fins 145 when mounted on the heat management device 119. For example, as shown in FIG. 2A, the height, $h_c$, of the tubular capacitor 104 can cause the top of the electronics 101 to extend beyond the height, $h_f$, of the cooling fins 145. Thus, in these arrangements, the overall height of the system 100 can be affected, or driven by, the height, $h_c$, of the tall tubular capacitor 104. It can be advantageous to reduce the height of electronics components such as the tubular capacitor 104 to improve the overall form factor of the illumination system 100.

Skilled artisans will appreciate that the tubular electrolytic capacitor 104 shown in FIG. 2A can be formed by rolling a capacitive film into a cylindrical profile and disposing the film within a capacitor housing. For example, FIG. 2B is a schematic perspective view of a conventional tubular capacitor 104. As shown in FIG. 2B, the tubular capacitor 104 can include a capacitor housing 106 and one or more leads 117 configured to electrically couple to an external device or. As explained above, the tubular capacitor 104 can have a height, $h_c$, that is relatively large in relation to other electronic components. A rolled capacitive film (not shown in FIG. 2B) can be disposed within the cylindrical capacitor housing 106.

Figure 2C:
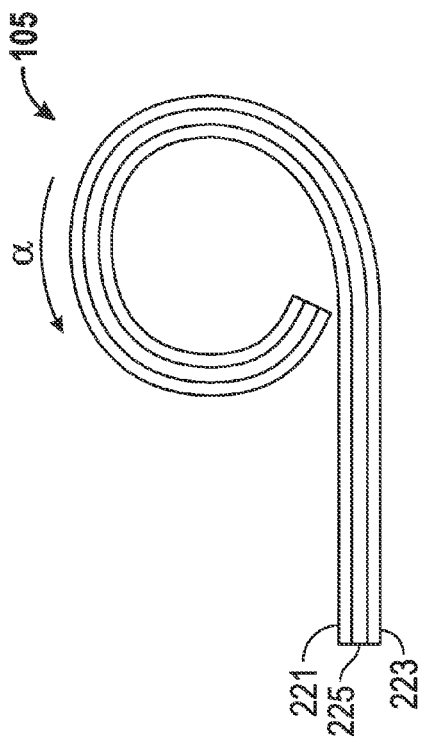
FIG. 2C is a side cross-section view of a capacitive film showing how conventional tubular capacitors can be formed by rolling an unrolled capacitive film into a cylindrical profile.
Figure 2B:
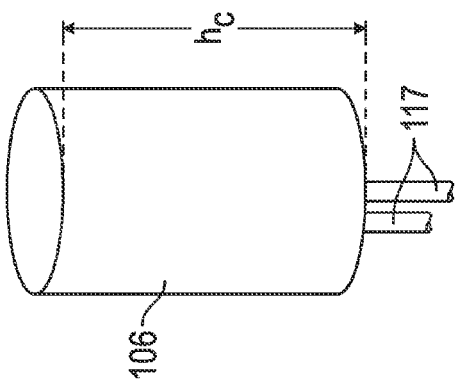
FIG. 2B is a schematic perspective view of a conventional tubular capacitor.

FIG. 2C is a side cross-sectional view of a capacitive film 105 showing how conventional tubular capacitors can be formed by rolling an unrolled capacitive film into a rolled, cylindrical profile. As shown in FIG. 2C, the capacitive film 105 can include a dielectric layer 225 disposed between a first conductive layer 221 and a second conductive layer 223. The first conductive layer 221 and the second conductive layer 223 can be formed of any suitable conductor, such as a metal film or a metal foil. The dielectric layer 225 can be any suitable dielectric material, such as an insulator. In some implementations the dielectric layer 225 can be a polymer. In electrolytic capacitors, an electrolyte and oxide films form some of the conductive and insulating components. The conductive and insulating components may be coated or encapsulated in an insulating polymer layer. As FIG. 2C illustrates, the unrolled film 105 can be rolled into a cylindrical profile by rolling the film 105 in a rolling direction, a. Once the film 105 is rolled into the cylindrical shape or profile, the film 105 can be disposed within the capacitor housing 106.

As explained above, the large height, $h_c$, of the conventional tubular capacitor 104 can be disadvantageous for various illumination systems. One way to reduce the height of illumination systems is to replace the tall tubular capacitor 104 with a thin capacitive film. Indeed, in the conventional tubular capacitor 104 of FIG. 2B, the element that creates capacitance is the thin capacitive film 105 shown in FIG. 2C. The tall height, $h_c$, of the tubular capacitor 104 results from rolling the film 105 into a cylindrical profile and then standing the rolled film 105 along an edge of the film 105. In the implementations explained below, however, the small thickness of the capacitive film 105 can be exploited to reduce the overall system thickness.

FIG. 3A is a side cross-sectional view of one implementation of an illumination system 200 including electronics 101 coupled with a light emitter 152 and a capacitive film 205 positioned under a plurality of cooling fins 145. FIG. 3B is a top plan view of the illumination system 200 of FIG. 3A. Unless otherwise noted, like reference numerals refer to components similar to those described with respect to FIG. 2A. As shown, the illumination system 200 shown in FIG. 3A can have a lower profile or height than the illumination system 100 shown in FIG. 2A.

One way to reduce the height of the illumination system is to attach a capacitive film 205 to the first surface 162 of the assembly 120 and to electrically couple the film 205 to the electronics 101. As shown in the implementation of FIG. 3A, the capacitive film 205 can be positioned between the first surface 162 of the assembly 120 and the cooling fins 145. Thus, in FIG. 3A, the capacitive film 205 can be a substantially planar capacitive sheet having a thickness, t. The capacitive film 205 can electrically couple to the electronics substrate 103 of the electronics 101 by way of electrical leads 217 formed with or coupled to the film 205.

As shown in the top view of FIG. 3B, a plurality of capacitive films 205a, 205b, and 205c can also be attached to the assembly 120 and coupled to the electronics 101 (not shown in FIG. 3B, although reference numeral 101 points to a perimeter of the electronics 101). For example, each capacitive film 205a, 205b, and 205c can be positioned on a surface of the lighting apparatus 200. As shown in FIGS. 3A and 3B, the capacitive films 205a, 205b, and 205c can be positioned under and/or adjacent to the area where the electronics 101 is mounted. The multiple films 205a, 205b, and 205c can replace not only the large tubular capacitor 104 shown in FIG. 2A, but any other capacitors typically included in the electronics 101. Indeed, the films 205a, 205b, and 205c can also be used to replace or supplement the smaller capacitors sometimes included in the electronics 101.

In the implementation of FIGS. 3A and 3B, the electronics 101 can be coupled to the assembly 120 over the light emitter 152. Note that the cooling fins 145 are not illustrated in FIG. 3B for purposes of clarity, however, as shown in FIG. 1F and in the cross-section of FIG. 3A, the cooling fins 145 can be coupled to an outer surface of the capacitive film 205 (e.g., 205a, 205b, and/or 205c). The cooling fins 145 can extend radially from a position adjacent the electronics 101 to the outer perimeter of the system 101. The cooling fins 145 can thus be positioned around a perimeter of the electronics 101. Further, as shown in FIG. 3B, the leads 217 of the films 205a, 205b, and 205c can be positioned around the periphery of the electronics 101 to connect to the electronics substrate 103.

Figure 3D:
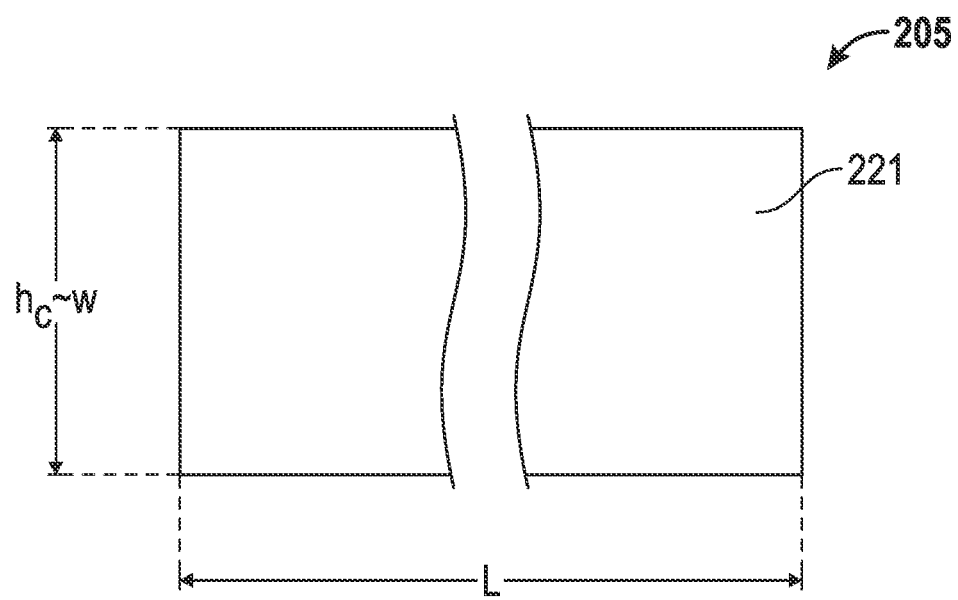
FIG. 3D is a top plan view of the unrolled capacitive film of FIG. 3C.

As explained above, by using a thin capacitive sheet or film 205 instead of a tubular capacitor, the overall height of the system 200 can be reduced. FIG. 3C is a side cross-sectional view of the unrolled capacitive film 205, and FIG. 3D is a top plan view of the unrolled capacitive film 205 of FIG. 3C. Note that, as used herein, the unrolled capacitive film 205 can in some implementations be a capacitive film that was unrolled from a cylindrical profile into a substantially planar profile. Indeed, in other implementations, the unrolled capacitive film 205 can simply be a substantially planar film 205 that has not been rolled into a cylindrical profile. Thus, the unrolled capacitive film 205 can be provided by forming a capacitive film into a substantially planar sheet. Furthermore, the disclosed capacitive films 205 may be electrolytic films, however, in other implementations, the capacitive films can be other types of capacitive elements, such as, e.g., polymer capacitive films. In addition, although the top plan view of FIG. 3D shows a rectangular, unrolled capacitive film 205, the unrolled film may be rectangular, especially when used with a rectangular or square lighting apparatus, but it need not be rectangular. In some implementations, the unrolled capacitive film 205 may be a strip, multiple strips in electrical contact with each other, or a stack of strips. Indeed, from a top plan view, the unrolled film may take any suitable shape, such as the unrolled pie-shaped profiles illustrated in, for example, FIG. 3B.

If the capacitive film 205 shown in FIGS. 3C-3D were used in a conventional tubular capacitor, then the height, $h_c$, of the capacitor may be closely matched to the width w of the capacitive film 205, which can be quite large compared to the thickness, t, of the film 205, as shown in FIGS. 3C and 3D. However, because the capacitive film 205 is attached to the assembly 120 in FIGS. 3A and 3B as a sheet, only the thickness, t, contributes to the overall height or profile of the illumination system 200.

The resulting reduction in system height or profile may be accomplished at the expense of an increased lateral footprint, because the surface area of the capacitive film 205 can be quite large in some arrangements. However, it should be appreciated that the disclosed low-profile illumination system 200 may already have a sufficiently large footprint to support the surface area of the capacitive film 205 due to the desired size of the illumination area. Accordingly, the overall system height can be substantially reduced without enlarging the footprint of the system 200. For example, calculations indicate that a stack of ten, flat 0.8 mm thick polymer capacitors each filling a 120 cm$^2$ area could provide a suitable output capacitance of around 470 µF for a lighting apparatus power supply at a height profile of about 0.3 inches.

The capacitance of each of the capacitors illustrated in the implementations of FIGS. 3A-3B can be about the same as the capacitances in the arrangement of FIG. 2A. In some implementations, the capacitive film 205 can be electrolytic. For example, the film 205 can include an electrolyte within one or more layers of the film 205.

Furthermore, in other implementations, instead of using electrolytic capacitors, polymer capacitors can be used in the capacitive film 205 of FIGS. 3A and 3B. An additional advantage of using polymer capacitors is that electrolytic capacitors may not function as long as polymer capacitors because the electrolyte can leak and/or the electrolyte and oxide film can otherwise degrade. Because light emitters 152 such as LEDs can have a long lifetime, it can therefore be advantageous to use capacitors that also have a long lifetime. In some cases, a polymer capacitive film may be thicker and have a larger unrolled area than the corresponding electrolytic film, but the thickness of the polymer capacitive film would nevertheless result in a substantial reduction in overall system height.

Figure 3E:
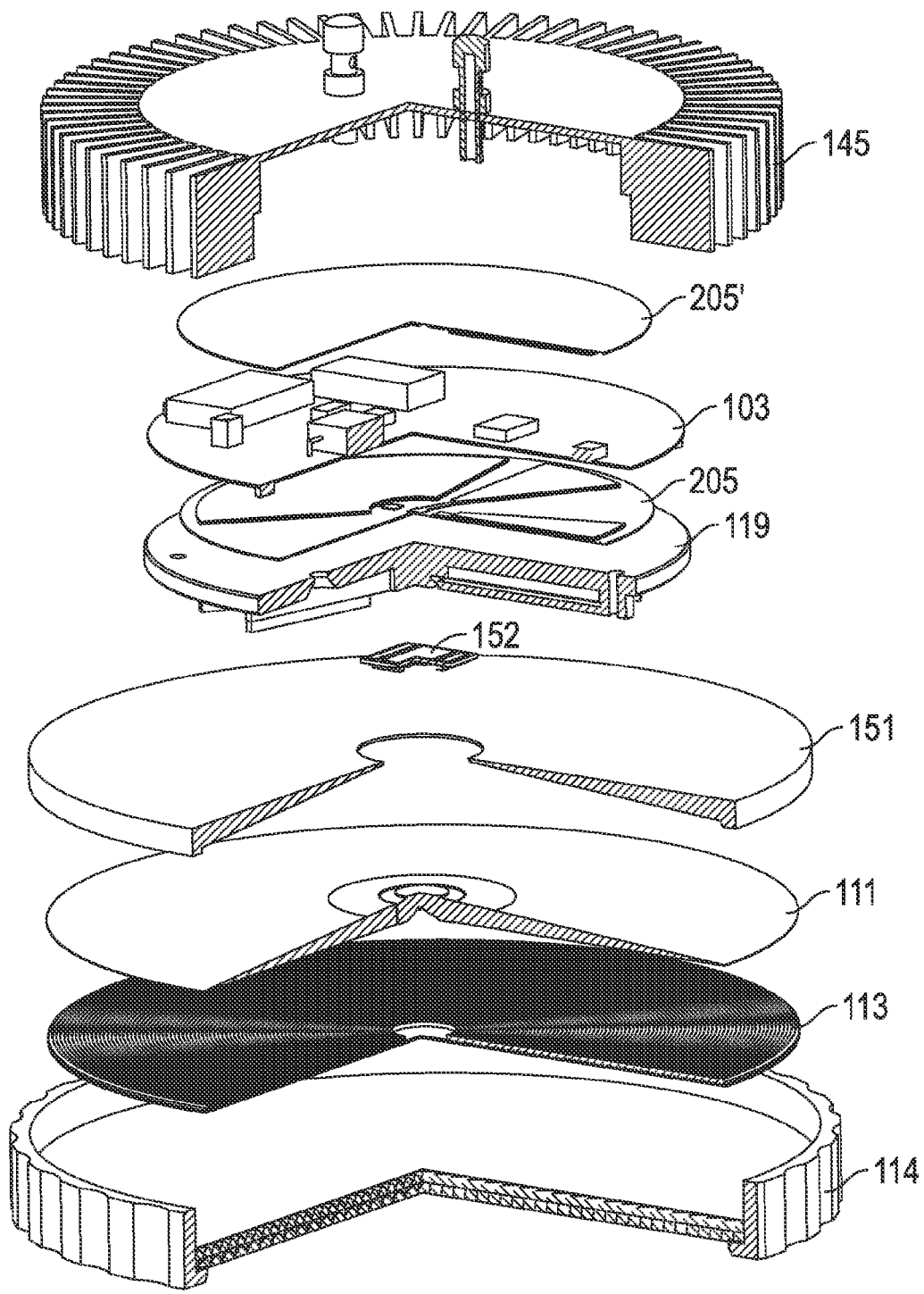
FIGS. 3E and 3F are perspective and exploded views of an example of a lighting apparatus such as shown in FIG. 3A.
Figure 3F:
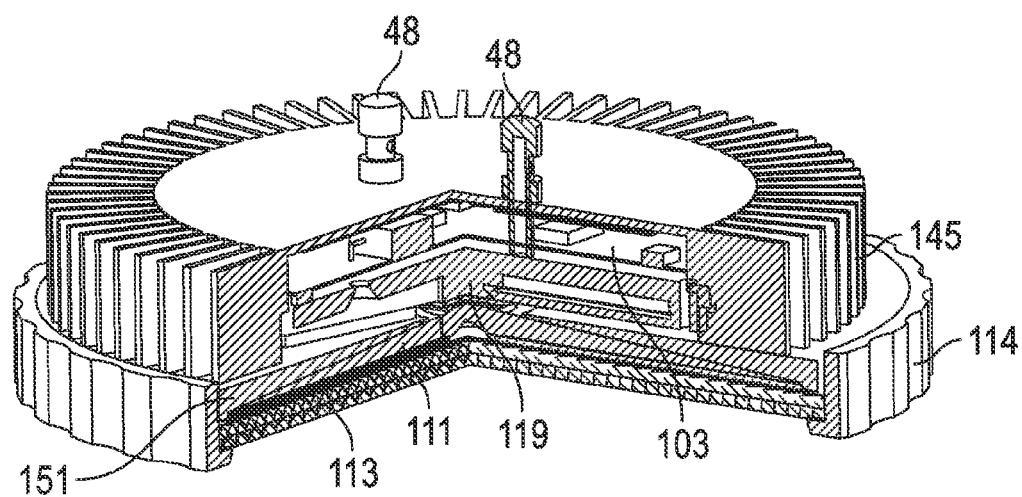

FIGS. 3E and 3F are perspective and exploded views of a lighting apparatus such as shown in FIG. 3A, where the same designation numbers are used for the same components. As illustrated in FIGS. 3E and 3F, housing 114 includes a pair of lenticular beam shaping lenses for shaping the output light beam after it is turned down by the light-turning film 113. Further, in the implementation of FIGS. 3E and 3F, a first set of one or more capacitive films 205 is positioned under the electronics substrate 103, and a second set of one or more capacitive films 205' is positioned above the electronics substrate 103. In various implementations, either or both may be provided. As illustrated, capacitive films 205 and 205' are mounted onto substrates. The capacitive films in capacitive films 205' are obscured by the substrate.

Figure 4A:
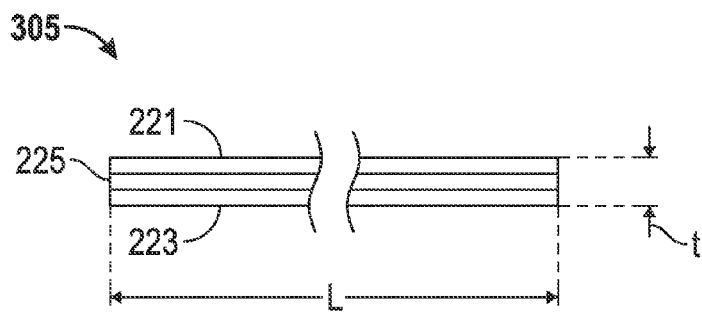
FIG. 4A is a side cross-sectional view of an unrolled capacitive film, according to one implementation.
Figure 4B:
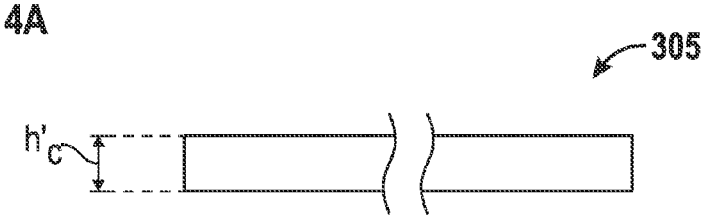
FIG. 4B is a top plan view of the unrolled capacitive film of FIG. 4A.
Figure 4C:
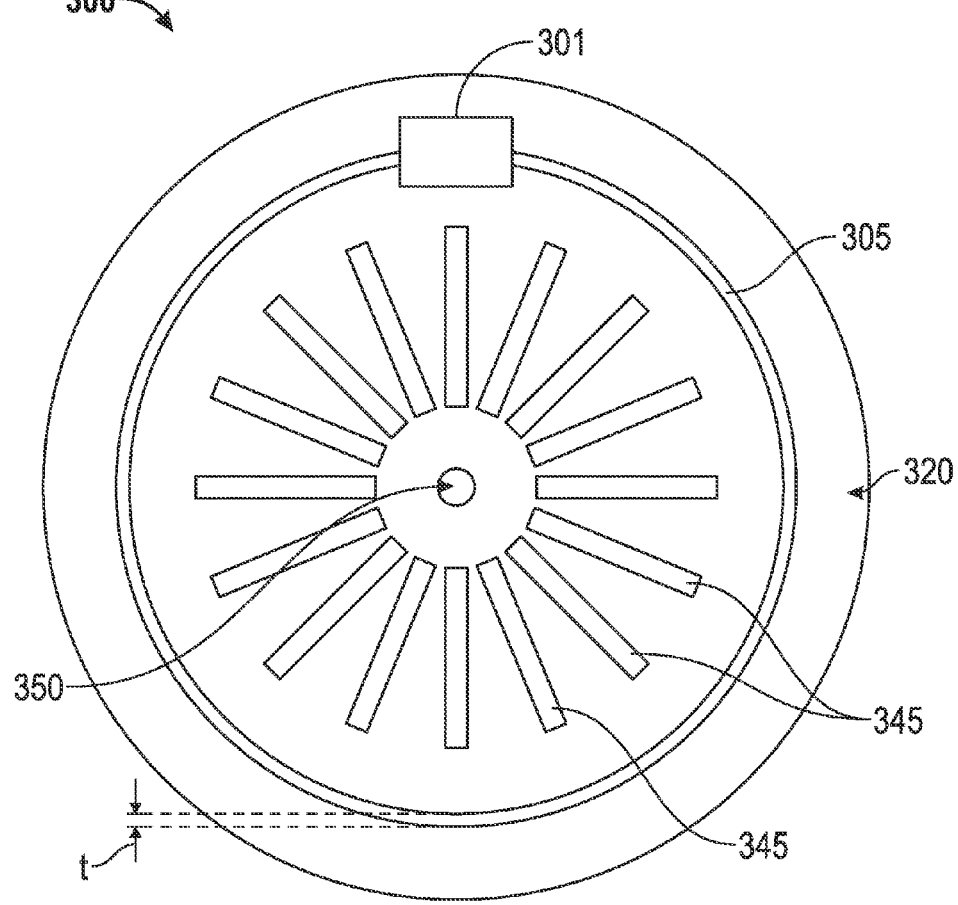
FIG. 4C is a top plan view of an illumination system, according to another implementation.

Turning to FIGS. 4A-4C, another implementation of an illumination system 300 is disclosed. In the implementation of FIGS. 4A-4C, instead of using a substantially planar capacitive sheet, a thin capacitive strip can be mounted around the periphery of the cooling fins, e.g., around the circumference or perimeter of the system 300. FIG. 4A is a side cross-sectional view of an unrolled capacitive film 305, according to one implementation. FIG. 4B is a top plan view of the unrolled capacitive film 305 of FIG. 4A. As shown in FIG. 4B, the capacitive film 305 can be formed as a thin capacitive strip. For example, the capacitive film 205 shown in FIG. 3D can be formed as a long, thin strip of capacitive material such that the height of the capacitive film 305 when it stands on a side edge is given by $h_c'$, which can be significantly less than the height $h_c$ of the capacitive film 205 shown in FIG. 3D.

FIG. 4C is a top plan view of the illumination system 300. As shown in FIG. 4C, cooling fins 345 can extend radially outward from the center. The capacitive film 305, formed as a thin capacitive strip, can extend around the periphery of the cooling fins 345, either in contact with the cooling fins (which may be suitable in the implementations of FIGS. 1F and 3A where the fins extend all the way to the periphery of the lighting apparatus) or spaced away from the ends of the cooling fins on another circumferential structure as shown in FIG. 4C. In the implementation of FIG. 4C, the capacitive film 305 can be attached to a surface of the system 300 such that a side of the film 305 is attached thereto. Thus, from the top plan view of FIG. 4C, the side edge of the capacitive film 305, which can be defined by the thickness t of the strip, is shown. It will be appreciated that the capacitive strip 305 can be wrapped around the lighting apparatus multiple times. Furthermore, the capacitive strip 305 can be wrapped or placed on any surface of the lighting apparatus, not only near or around cooling fins.

In this implementation, the electronics 301 can be positioned near the periphery of the illumination system 300 and can couple to the leads of the capacitive film 305. Thus, in FIG. 4C, the cooling fins 345 can be positioned between the electronics 301 and the light emitter position 350 in the center of the apparatus. This arrangement can advantageously allow for the use of more and/or larger cooling fins 345 coupled above the light emitter region 350, which can improve the thermal dissipation of heat away from the light emitter region 350. The overall height of the illumination system 300 can also be further reduced relative to the implementation of FIGS. 3A-3B, because the cooling fins 345 are not attached to a top surface of the capacitive film. Thus, in the implementation shown in FIG. 4C, the capacitive film 305 can effectively be decoupled from the overall height of the system 300. Accordingly, in the implementation of FIGS. 4A-4C, the height of the system 300 can be reduced, and in some arrangements, the thermal performance of the system 300 can be improved as well.

Figure 5:
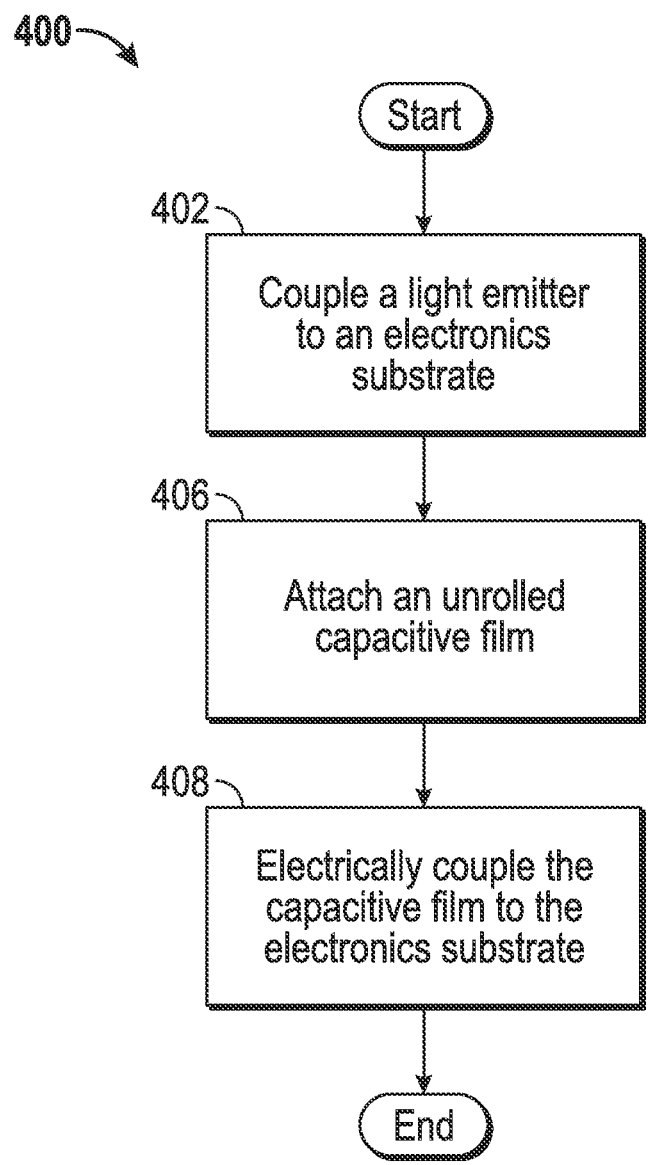
FIG. 5 is a flowchart illustrating one method for manufacturing an illumination system.

FIG. 5 is a flowchart illustrating one method 400 for manufacturing an illumination system. The method 400 can begin in a block 402 where a light emitter is coupled, for example electronically coupled, to an electronics substrate. As explained herein, the light emitter can be an LED in various implementations, but other emitters are possible. The electronics substrate can include, for example, an AC-to-DC conversion circuit mounted thereon. The electronics substrate can be, e.g., a PCB. In some implementations, the electronics substrate can be mounted over the light emitter region. In other implementations, the electronics can be positioned at or near the periphery of the illumination system.

The method then moves to a block 406 to attach an unrolled capacitive film to the illumination system. In some implementations, the capacitive film can be a capacitive sheet, which may in various implementations be positioned under a plurality of cooling fins, and/or above the electronics substrate, and/or below the electronics substrate. In other implementations, the capacitive film can be a thin capacitive strip which can be attached to the illumination system by positioning the capacitive strip around at least a portion of the perimeter of the illumination system.

The method then continues to a block 408 to electrically couple the capacitive film to other circuit elements on or otherwise associated with the electronics substrate. In various implementations, one or more leads from the capacitive film can be electrically coupled to the electronics substrate by way of, e.g., soldering the leads to the electronics substrate.

In addition, in some implementations, a plurality of cooling fins can be coupled to the illumination system. In some implementations, the cooling fins can be positioned at least partially around a perimeter of the electronics substrate. The cooling fins can also be positioned at least partially around the light emitter. In other implementations, the cooling fins can be positioned between the electronics substrate and the light emitter.

In further implementations, thin capacitive films can be used in integrated device packages other than lighting systems, including integrated circuit (IC) packages, microelectromechanical systems (MEMS) packages, or any other suitable type of package where a low-profile package is desired. It should be appreciated that various types of packages may normally use a tubular capacitor similar to those described above for various purposes, which can increase the profile or height of the package. Thus, in some implementations, a substantially flat, unrolled capacitive sheet can be coupled to an electrical contact on a surface of a package substrate such as a PCB. A device die, such as an IC, MEMS, or optical device, can be mounted on a top surface of the package substrate. The package can be configured to attach to an external system, such as a motherboard of the larger system. By coupling a capacitive sheet, for example, to the bottom surface of the package substrate, the package height can accordingly be reduced. As with the implementation of FIG. 3A, the sheet may be disposed between the package and the external system in various arrangements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the illumination system as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A lighting apparatus comprising:
an assembly including a light source coupled to optical components and having a first surface and a second surface opposite the first surface;
an electronics substrate including components of an electrical circuit mounted to the lighting apparatus, the electronics substrate mechanically coupled to the first surface;
a plurality of cooling fins coupled to the first surface, the plurality of cooling fins positioned at least partially around a perimeter of the electronics substrate in an annular pattern; and
an unrolled capacitive film electrically coupled to the electrical circuit, the unrolled capacitive film comprising a flat sheet with an at least partially annular shape as viewed from a top plan view, the unrolled capacitive film coupled to or disposed around the electronics substrate.

2. The lighting apparatus of claim 1, wherein the unrolled capacitive film includes at least one of an electrolyte and a polymer layer.

3. The lighting apparatus of claim 1, wherein the apparatus includes a light guide plate and a light emitter coupled to the light guide plate, and wherein a height of the electronics substrate and components is less than a height of the cooling fins.

4. The lighting apparatus of claim 3, wherein the unrolled capacitive film includes a substantially flat capacitive sheet, and is positioned under the cooling fins.

5. The lighting apparatus of claim 4, wherein the capacitive sheet includes a dielectric layer disposed between a first conductive layer and a second conductive layer, the capacitive sheet having a first surface defined by an outer surface of the first conductive layer and a second surface opposite the first surface and defined by an outer surface of the second conductive layer, wherein the plurality of cooling fins are attached to the first surface of the capacitive sheet, and wherein the second surface of the capacitive sheet is attached to the first surface.

6. The lighting apparatus of claim 4, wherein the electronics substrate is coupled to the lighting apparatus over a light emitter.

7. The lighting apparatus of claim 3, wherein the unrolled capacitive film includes a capacitive strip having opposing side edges defined by a thickness of the capacitive strip, and wherein one of the side edges is positioned around at least a portion of the perimeter of the apparatus.

8. The lighting apparatus of claim 7, wherein the plurality of cooling fins are positioned between the electronics substrate and the light emitter.

9. The lighting apparatus of claim 1, wherein at least some of the electrical circuit components form an AC-to-DC converter.

10. The lighting apparatus of claim 1, wherein the unrolled capacitive film includes a first lead electrically coupled to a first electrical contact of the electronics substrate and a second lead electrically coupled to a second electrical contact of the electronics substrate.

11. The lighting apparatus of claim 1, further comprising a plurality of capacitive films electrically coupled to the electrical circuit.

12. The lighting apparatus of claim 1, wherein the light emitter includes a light emitting diode.

13. A method for manufacturing an illumination system, the method comprising:
    coupling an electronics substrate including components of an electrical circuit to a light emitter;
    coupling a plurality of cooling fins to the illumination system, the plurality of cooling fins positioned at least partially around a perimeter of the electronics substrate in an annular pattern;
    attaching an unrolled capacitive film to the illumination system, the unrolled capacitive film comprising a flat sheet with an at least partially annular shape as viewed from a top plan view, the unrolled capacitive film coupled to or disposed around the electronics substrate; and
    electrically coupling the unrolled capacitive film to the electrical circuit.

14. The method of claim 13, further including coupling the plurality of cooling fins to the illumination system at least partially around the light emitter, wherein the unrolled capacitive film includes a substantially flat capacitive sheet, and wherein attaching the unrolled capacitive film includes positioning the capacitive sheet between a first surface of the illumination system and the plurality of cooling fins.

15. The method of claim 13, wherein the unrolled capacitive film includes a capacitive strip, and wherein attaching the capacitive film includes positioning the capacitive strip around at least a portion of the perimeter of the illumination system.

16. The method of claim 15, further including coupling the plurality of cooling fins to the illumination system and positioning the plurality of cooling fins between the electronics and the light emitter.

17. An illumination system comprising:
    means for guiding light;
    means for emitting light coupled to the light guiding means;
    power supply means coupled to the light guiding means;
    a plurality of cooling means coupled to the light guiding means, the plurality of cooling means positioned at least partially around a perimeter of the power supply means in an annular pattern; and
    means for providing low profile capacitance to the power supply means, the low profile capacitance providing means comprising an unrolled flat capacitive sheet with an at least partially annular shape as viewed from a top plan view, the unrolled flat capacitive sheet coupled to or disposed around the power supply means.

18. The illumination system of claim 17, wherein the light emitting means includes a light emitting diode.

19. The illumination system of claim 17, wherein the light guiding means includes a light guide plate.

20. The illumination system of claim 18, wherein the plurality of cooling means includes a plurality of cooling fins, and wherein the unrolled flat capacitive sheet positioned under the cooling fins.

21. The illumination system of claim 18, wherein the plurality of cooling means includes a plurality of cooling fins, and wherein the capacitive means includes a capacitive strip positioned around at least a portion of the perimeter of the illumination system.

22. A low profile package for an electronic module configured for incorporation into an external system, the package comprising:
    at least one package substrate having a first surface and a second surface opposite the first surface;
    an integrated device die mounted to the first surface of the package substrate;
    a plurality of cooling fins coupled to the package, the plurality of cooling fins positioned at least partially around a perimeter of the at least one package substrate in an annular pattern; and
    a substantially flat, unrolled capacitive sheet electrically coupled to at least one electrical contact on the second surface of the package substrate, the unrolled capacitive sheet having an at least partially annular shape as viewed from a top plan view, the unrolled flat capacitive sheet coupled to or disposed around the package substrate.

23. The package of claim 22, wherein the unrolled flat capacitive sheet includes an electrolyte.

24. The package of claim 22, wherein the unrolled flat capacitive sheet includes a polymer layer.

25. The package of claim 22, wherein the unrolled flat capacitive sheet is positioned to be disposed between the package substrate and the external system when the package is incorporated into the external system.

26. The package of claim 22, wherein the external system is a lighting system.

27. The package of claim 22, wherein the unrolled flat capacitive sheet is positioned at least partially around a perimeter of the package substrate.

28. The package of claim 27, wherein the unrolled flat capacitive sheet is wrapped partially, fully, or multiple times around the perimeter of the package substrate.

29. The lighting apparatus of claim 1, wherein each cooling fin of the plurality of cooling fins extends upwardly from the first surface such that a distal end of each fin is positioned above an uppermost surface of the electronics substrate and components.

30. The lighting apparatus of claim 1, wherein each cooling fin of the plurality of cooling fins extends radially outward relative to the electronics substrate and components.

* * * * *